(12) United States Patent
Crombez et al.

(10) Patent No.: US 9,493,075 B2
(45) Date of Patent: Nov. 15, 2016

(54) REGENERATIVE BRAKING CONTROL SYSTEM AND METHOD

(71) Applicant: FORD GLOBAL TECHNOLOGIES, LLC, Dearborn, MI (US)

(72) Inventors: Dale Scott Crombez, Livonia, MI (US); Kerem Bayar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/225,029

(22) Filed: Mar. 25, 2014

(65) Prior Publication Data

US 2015/0274018 A1 Oct. 1, 2015

(51) Int. Cl.
*B60L 7/18* (2006.01)
*B60L 15/20* (2006.01)
*B60T 8/52* (2006.01)
*B60L 7/14* (2006.01)
*B60L 7/26* (2006.01)
*B60T 8/176* (2006.01)
*B60T 8/17* (2006.01)
*B60W 20/00* (2016.01)
*B60T 1/10* (2006.01)
(Continued)

(52) U.S. Cl.
CPC .............. *B60L 7/18* (2013.01); *B60L 3/108* (2013.01); *B60L 7/14* (2013.01); *B60L 7/26* (2013.01); *B60L 15/2009* (2013.01); *B60T 1/10* (2013.01); *B60T 8/17* (2013.01); *B60T 8/176* (2013.01); *B60T 8/52* (2013.01); *B60T 13/586* (2013.01); *B60W 10/08* (2013.01); *B60W 10/184* (2013.01); *B60W 20/00* (2013.01); *B60W 20/14* (2016.01); *B60W 30/09* (2013.01); *B60W 30/18127* (2013.01); *F16D 61/00* (2013.01); *B60W 2510/182* (2013.01); *B60Y 2300/89* (2013.01); *Y10S 903/947* (2013.01)

(58) Field of Classification Search
CPC ............ B60L 7/26; B60L 7/14; B60L 3/108; B60L 7/18; B60L 15/2009; B60T 8/52; B60T 8/17; B60T 8/176
USPC ............................................... 701/22, 70, 71
See application file for complete search history.

(56) References Cited

U.S. PATENT DOCUMENTS 6,275,763 B1 * 8/2001 Lotito ...................... B60L 7/26
180/165
6,687,593 B1 * 2/2004 Crombez .................. B60T 1/10
180/170

(Continued)

FOREIGN PATENT DOCUMENTS

EP 1839985 B1 2/2012

*Primary Examiner* — Thomas G Black
*Assistant Examiner* — Sze-Hon Kong
(74) *Attorney, Agent, or Firm* — David Kelley, Esq.; Tung & Associates

(57) ABSTRACT

A system for controlling regenerative braking in an electrified vehicle to prevent or minimize reduction of overall braking torque during wheel slip events includes an antilock braking system adapted to transmit an antilock braking system active signal and a regeneration powertrain interfacing with the antilock braking system. The regeneration powertrain is adapted to inhibit regenerative braking torque reduction responsive to receiving the antilock braking system active signal during a high deceleration braking event. A method for controlling regenerative braking in an electrified vehicle to prevent or minimize reduction of overall braking torque during wheel slip events is also disclosed.

20 Claims, 2 Drawing Sheets

(51) Int. Cl.
  *B60T 13/58* (2006.01)
  *B60W 10/08* (2006.01)
  *B60W 10/184* (2012.01)
  *B60W 30/09* (2012.01)
  *B60W 30/18* (2012.01)
  *F16D 61/00* (2006.01)
  *B60L 3/10* (2006.01)

(56) References Cited

U.S. PATENT DOCUMENTS

| | | | |
|---|---|---|---|
| 6,709,075 B1 | 3/2004 | Crombez et al. | |
| 7,575,287 B2 * | 8/2009 | Matsuura | B60K 6/365 303/152 |
| 7,654,620 B2 * | 2/2010 | Jeon | B60L 3/10 303/138 |
| 2006/0220453 A1 * | 10/2006 | Saito | B60L 7/26 303/152 |
| 2007/0126382 A1 * | 6/2007 | Kang | B60L 7/10 318/376 |
| 2007/0228822 A1 | 10/2007 | Hirata | |
| 2011/0148184 A1 | 6/2011 | Suzuki et al. | |
| 2011/0276245 A1 | 11/2011 | Krueger et al. | |
| 2012/0136547 A1 * | 5/2012 | Miyazaki | B60T 1/10 701/70 |
| 2012/0226402 A1 * | 9/2012 | Minamiura | B60T 1/10 701/22 |
| 2012/0265419 A1 * | 10/2012 | Kim | B60L 3/104 701/71 |
| 2012/0319465 A1 * | 12/2012 | Koyama | B60T 1/10 303/3 |
| 2013/0085650 A1 * | 4/2013 | Nakamura | B60T 1/10 701/71 |
| 2013/0162009 A1 * | 6/2013 | Mitts | B60L 3/102 303/3 |
| 2013/0173127 A1 * | 7/2013 | Nakatsu | B60L 3/102 701/70 |
| 2013/0184953 A1 * | 7/2013 | Morishita | B60T 7/042 701/70 |
| 2013/0218435 A1 * | 8/2013 | Nakamura | B60L 7/14 701/70 |
| 2014/0095046 A1 * | 4/2014 | Nishio | B60T 1/10 701/81 |
| 2014/0136039 A1 * | 5/2014 | Tanishima | B60K 6/48 701/22 |
| 2014/0207355 A1 * | 7/2014 | Akaho | B60L 7/18 701/71 |
| 2014/0257664 A1 * | 9/2014 | Arbitmann | B60L 7/26 701/71 |
| 2015/0159638 A1 * | 6/2015 | Saito | B60T 8/442 417/540 |
| 2015/0197230 A1 * | 7/2015 | Kolarsky | B60T 8/3265 701/70 |
| 2015/0217742 A1 * | 8/2015 | Koyama | B60T 13/14 303/6.01 |
| 2015/0266383 A1 * | 9/2015 | Kidston | B60L 7/26 701/70 |
| 2016/0039292 A1 * | 2/2016 | Takahashi | B60W 10/08 701/70 |

* cited by examiner

REGENERATIVE BRAKING CONTROL SYSTEM AND METHOD

FIELD

Illustrative embodiments of the disclosure generally relate to regenerative braking. More particularly, illustrative embodiments of the disclosure relate to a system and method for controlling regenerative braking to prevent or minimize reduction of overall braking torque during wheel slip events.

BACKGROUND

To improve fuel economy, hybrid electric vehicles (HEVs) may utilize regenerative (regen) braking, in which kinetic energy is converted by an electric machine into storable energy during braking and then made available for vehicle propulsion. During a wheel slip event (e.g., an ABS event), regenerative braking may be removed. The transition from regenerative braking to friction braking may be abrupt and may result in a temporary reduction in overall braking torque as the regenerative braking is removed and the friction braking is applied. If the ABS event occurs on a surface with a low friction coefficient, a faster rate of regenerative braking reduction may be advantageous since it may minimize wheel lockup. However, if the slip event occurs on a surface with a high friction coefficient, fast regenerative braking reduction may not necessarily be advantageous. For example, if a wheel slip event occurs during a CMbB (Collision Mitigation by Brakes) event, especially at higher decelerations, it may not be necessary to reduce regenerative braking fast or even at all since such reduction may result in a 100-200 ms delay in overall braking torque generation.

Accordingly, a system and method for controlling regenerative braking to prevent or minimize reduction of overall braking torque during wheel slip events is needed.

SUMMARY

Illustrative embodiments of the disclosure are generally directed to a system for controlling regenerative braking in an electrified vehicle to prevent or minimize reduction of overall braking torque during wheel slip events. An illustrative embodiment of the system includes an antilock braking system adapted to transmit an antilock braking system active signal and a regeneration powertrain interfacing with the antilock braking system. The regeneration powertrain is adapted to inhibit regenerative braking torque reduction responsive to receiving the antilock braking system active signal during a high deceleration braking event.

Illustrative embodiments of the disclosure are further generally directed to a method for controlling regenerative braking in an electrified vehicle to prevent or minimize reduction of overall braking torque during wheel slip events. An illustrative embodiment of the method includes determining whether an antilock braking system is active, determining whether a high deceleration braking event is occurring and inhibiting reduction of regeneration braking torque if the high deceleration braking event is occurring.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
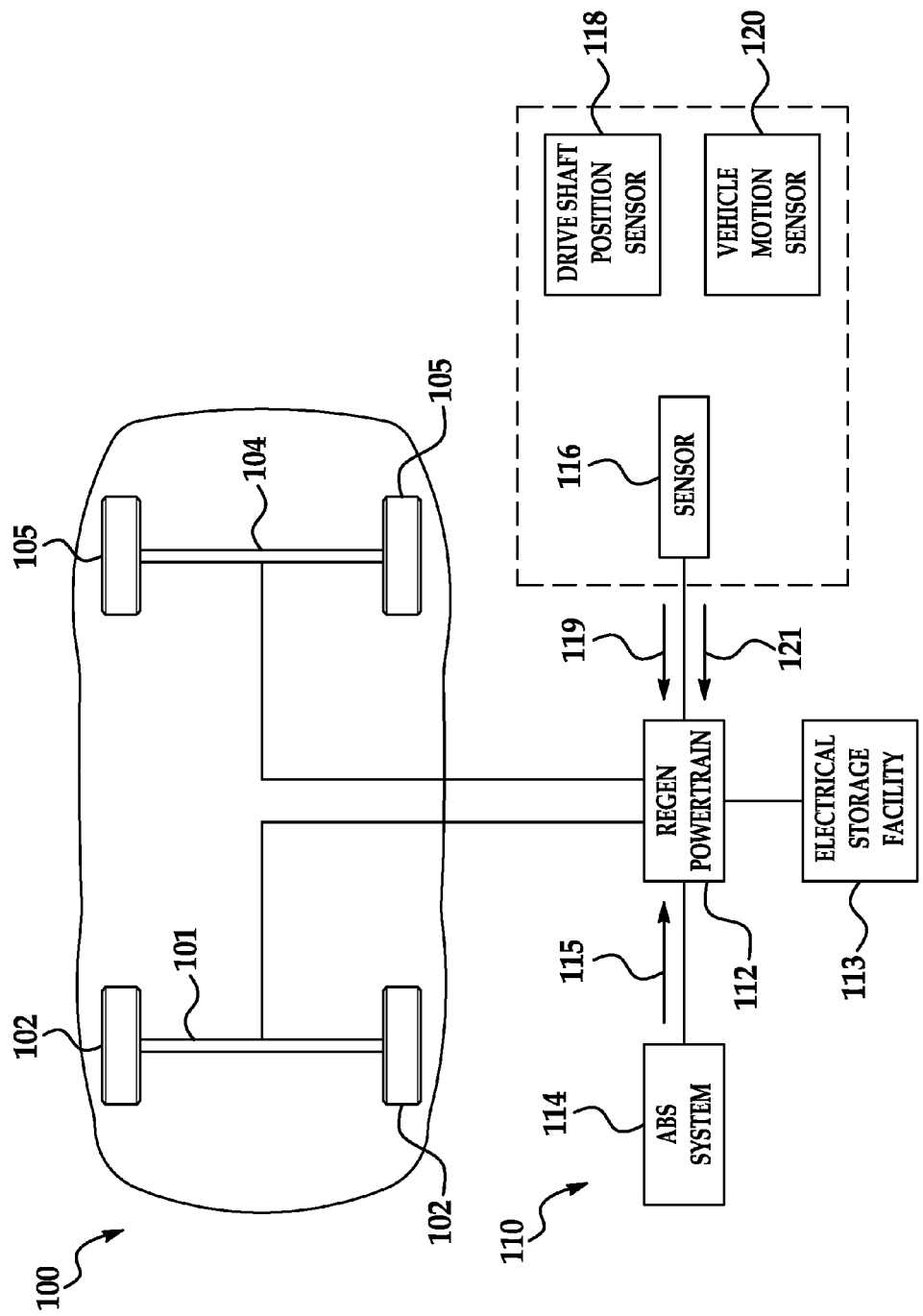
FIG. 1 is a schematic block diagram of an illustrative embodiment of the system for controlling regenerative braking to prevent or minimize reduction of overall braking torque during wheel slip events.

Referring initially to FIG. 1, an illustrative embodiment of the system for controlling regenerative braking to prevent or minimize reduction of overall braking torque during wheel slip events, hereinafter system, in implementation of an electrified vehicle 100, is generally indicated by reference numeral 110. The vehicle 100 may be a hybrid electric vehicle (HEV) or a plug-in hybrid electric vehicle (PHEV), for example and without limitation. The vehicle 100 may have a front axle 101 with a pair of front wheels 102 and a rear axle 104 with a pair of rear wheels 105.

The system 110 may include a regenerative powertrain 112 which interfaces with at least one of the front axle 101 and the rear axle 104 of the vehicle 100. In some embodiments, the regenerative powertrain 112 may interface with one or more front wheels 102 and/or one or more rear wheels 105 of the vehicle 100. The regenerative powertrain 112 may be adapted to apply regenerative torque to the front axle 101 and/or the rear axle 104 during braking of the vehicle 100, typically in the conventional manner. The regenerative powertrain 112 may be adapted to convert mechanical power from the rotating front axle 101 and/or rear axle 104 into electrical power. The electrical power may be stored in a battery or other suitable electrical storage facility 113 which electrically interfaces with the regenerative powertrain 112. The electrical power which is stored in the electrical storage facility 113 may be used in propulsion of the vehicle 100 such as in the conventional manner.

At least one sensor 116 may interface with the regenerative powertrain 108. The sensor 116 may include a drive shaft position sensor 118, for example and without limitation, which is provided on a draft shaft (not illustrated) of the vehicle 100. During operation of the vehicle 100, the drive shaft position sensor 118 may be adapted to detect wheel slip events at the front wheels 102 and/or the rear wheels 105 of the vehicle 100 using a limited slip control detection algorithm such as in the conventional manner. The drive shaft position sensor 118 may be further adapted to transmit a drive shaft position sensor signal 119 which indicates the wheel slip events to the regenerative powertrain 112.

In some embodiments, the sensors 116 may include at least one vehicle motion sensor 120 which interfaces with the regenerative powertrain 112. The vehicle motion sensor 120 may include at least one wheel speed sensor and/or at least one acceleration sensor (such as a longitudinal acceleration sensor, a lateral acceleration sensor, etc.), for example and without limitation. The vehicle motion sensor 120 may be adapted to transmit a motion sensor signal 121 which indicates wheel slip events to the regenerative powertrain 112.

An ABS (Antilock Brake) system 114 of the vehicle 100 may interface with the regenerative powertrain 112. The ABS system 114 may be adapted to transmit an ABS active signal 115 to the regenerative powertrain 112 during braking of the vehicle 100. The ABS active signal 115 may be transmitted from the ABS system 114 to the regen powertrain 112 via a CAN (controller area network, not shown).

In exemplary application of the system 110, at the onset of braking, the regenerative powertrain 112 applies torque to the front axle 101 and/or the rear axle 104 during braking of the vehicle 100. The regenerative powertrain 112 generates electrical power which may be stored in the electrical storage facility 113 and may be used in propulsion of the vehicle 100. Depending on the type of surface (e.g., friction coefficient) on which the vehicle 100 is traveling, the ABS system 114 may be engaged during braking of the vehicle 100 to ensure optimal braking of the vehicle 102 on the surface and prevent or eliminate wheel slip. Upon engagement, the ABS system 114 transmits the ABS active signal 115 to the regenerative powertrain 112. Accordingly, responsive to the ABS active signal 115, the regenerative powertrain 112 may normally reduce regenerative braking torque which is applied to the front axle 101, the front wheels 102, the rear axle 104 and/or the rear wheels 105 to increase friction braking torque.

In the event that wheel slippage occurs during a high deceleration braking event such as a CMbB (Collision Mitigation by Brakes) event, the regenerative powertrain 112 may receive input from the ABS system 114 via the ABS active signal 115. The regenerative powertrain 112 may inhibit or prevent reduction in regenerative braking torque which is applied to the front axle 101, the front wheels 102, the rear axle 104 and/or the rear wheels 105. Friction braking torque may then be applied to the front axle 101, the front wheels 102, the rear axle 104 and/or the rear wheels 105. Therefore, the transition between application of regenerative braking torque and application of friction braking torque may be substantially continuous or seamless and may substantially reduce or eliminate reduction in overall braking torque which is applied to the vehicle 100 during the CMbB event.

In some embodiments, the regenerative powertrain 112 may inhibit or prevent reduction in regenerative braking torque which is applied to the front axle 101, the front wheels 102, the rear axle 104 and/or the rear wheels 105 if the friction braking torque pressure is sufficient to modulate the ABS system 114 without having to reduce regenerative braking torque during the high deceleration braking event. This may be carried out alone or in combination with inhibiting or preventing reduction in regenerative braking torque during a CMbB event.

Figure 2:
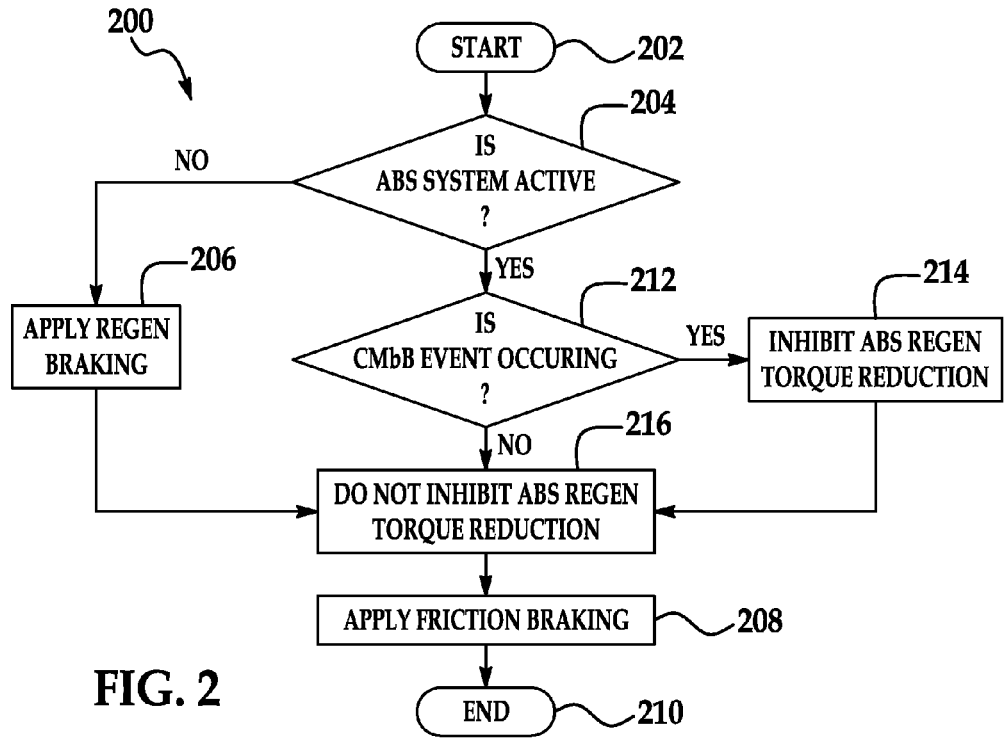
FIG. 2 is a block diagram of an illustrative embodiment of the method for controlling regenerative braking to prevent or minimize reduction of overall braking torque during wheel slip events.

Referring next to FIG. 2, a block diagram 200 of an illustrative embodiment of a method for controlling regenerative braking to prevent or minimize reduction of overall braking torque during wheel slip events during a high deceleration braking event is shown. The method 200 may begin at block 202 at the onset of braking. In some embodiments, a determination may be made as to whether the ABS system is active at block 204. If not, then regenerative braking may be applied at block 206 and friction braking may be applied at block 208. The method may end at block 210.

If the ABS system is active at block 204, a determination may be made as to whether a CMbB (Collision Mitigation by Brakes) event is occurring at block 212. If a CMbB event is occurring, then at block 214, ABS regenerative torque reduction may be inhibited or prevented and at block 208, friction braking may be applied. The method may end at block 212.

If a CMbB event is not occurring at block 212, then ABS regenerative braking torque reduction may not be inhibited at block 216. Friction braking may be applied at block 208 and the method may end at block 210.

Figure 3:
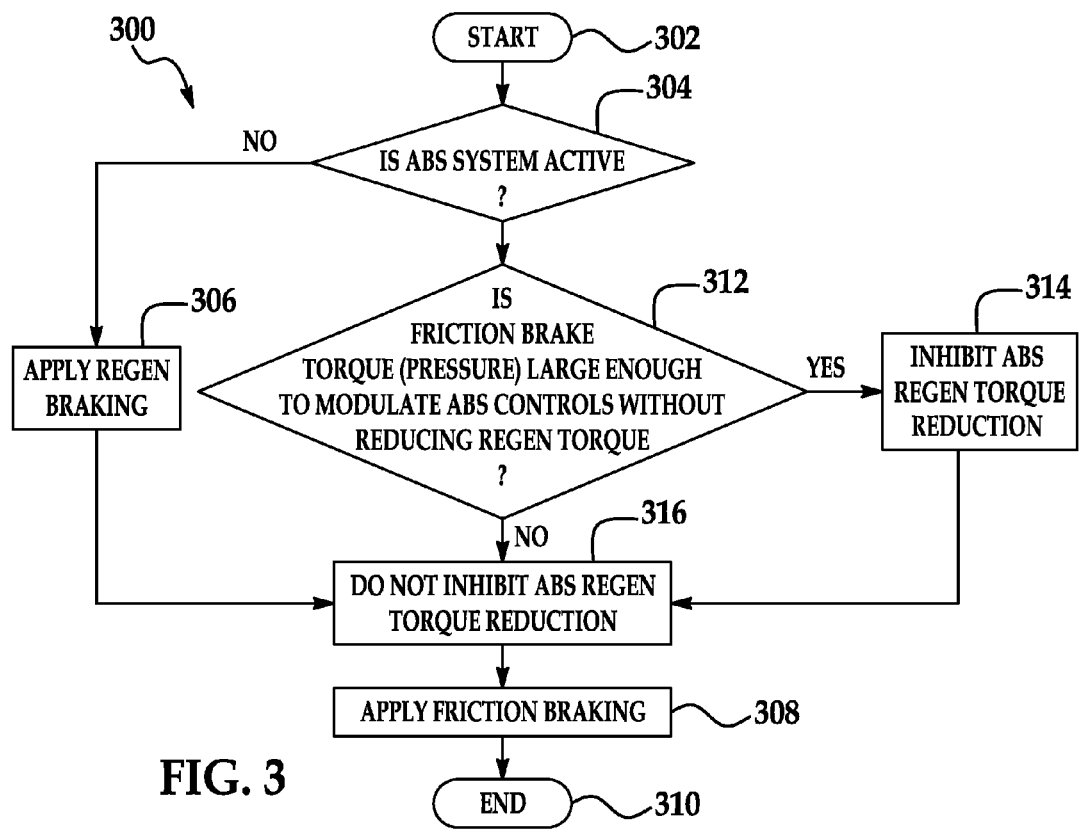
FIG. 3 is a block diagram of an alternative illustrative embodiment of the method for controlling regenerative braking to prevent or minimize reduction of overall braking torque during wheel slip events.

Referring next to FIG. 3, an alternative illustrative embodiment of the method for controlling regenerative braking to prevent or minimize reduction of braking torque during wheel slip events during a high deceleration braking event is shown. The method 300 may begin at block 302 at the onset of braking. In some embodiments, a determination may be made as to whether the ABS system is active at block 304. If not, then regenerative braking may be applied at block 306 and friction braking may be applied at block 308. The method may end at block 310.

If the ABS system is active at block 304, a determination may be made as to whether friction brake torque (pressure) which is being applied to the vehicle is of sufficiently large magnitude to modulate ABS controls without reducing application of regenerative braking torque. If yes, then at block 314 ABS regenerative torque reduction may be inhibited or prevented and at block 308, friction braking may be applied. The method may end at block 310.

If friction brake torque (pressure) which is being applied to the vehicle is not of sufficiently large magnitude to modulate ABS controls without reducing application of regenerative braking torque at block 312, then ABS regenerative braking torque reduction may not be inhibited at block 316. Friction braking may be applied at block 308 and the method may end at block 310.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system for controlling regenerative braking in an electrified vehicle to prevent or minimize reduction of overall braking torque during wheel slip events, comprising:
   an antilock braking system configured to transmit an antilock braking system active signal; and
   a regeneration powertrain interfacing with the antilock braking system, the regeneration powertrain configured to inhibit regenerative braking torque reduction responsive to receiving the antilock braking system active signal during a high deceleration braking event, the inhibiting following application of the regenerative braking torque at the onset of the high deceleration braking event, the inhibiting followed by friction braking.

2. The system of claim 1 wherein the vehicle comprises a hybrid electric vehicle.

3. The system of claim 1 wherein the vehicle comprises a plug-in hybrid electric vehicle.

4. The system of claim 1 further comprising an electrical storage facility configured to store electrical power from the regenerative braking system.

5. The system of claim 1 wherein the regeneration powertrain is configured to apply regenerative torque to at least one of a front axle and a rear axle of the vehicle.

6. The system of claim 1 wherein the regeneration powertrain is configured to apply regenerative torque to a selected one of front wheels and rear wheels of the vehicle.

7. The system of claim 1 wherein the regeneration powertrain is configured to inhibit regenerative braking torque reduction responsive to receiving the antilock braking system active signal during a collision mitigation by brakes event.

8. The system of claim 1 wherein the regeneration powertrain is configured to inhibit regenerative braking torque reduction responsive to receiving the antilock braking system active signal if friction braking torque pressure is sufficiently large to modulate the antilock braking system without reducing the regenerative braking.

9. The system of claim 1 wherein the regeneration powertrain is configured to apply regeneration braking torque if the regeneration powertrain does not receive the antilock braking system active signal from the antilock braking system.

10. The system of claim 1 wherein the regeneration powertrain is configured to not inhibit regenerative braking torque reduction if the high deceleration braking event is not occurring.

11. A method for controlling regenerative braking in an electrified vehicle to prevent or minimize reduction of overall braking torque during wheel slip events, comprising:
inhibiting reduction of regeneration braking torque if a high deceleration braking event is occurring when an antilock braking system is active, the inhibiting following application of the regenerative braking torque at the onset of the high deceleration braking event, the inhibiting followed by friction braking.

12. The method of claim 11 further comprising applying regeneration braking torque if the antilock braking system is not active.

13. The method of claim 12 further comprising applying friction braking if the antilock braking system is not active.

14. The method of claim 11 further comprising not inhibiting reduction of regeneration braking torque if the high deceleration event is not occurring.

15. The method of claim 11 further comprising determining whether a high deceleration braking event is occurring by determining whether a collision mitigation by brakes event is occurring.

16. A method for controlling regenerative braking in an electrified vehicle to prevent or minimize reduction of overall braking torque during wheel slip events, comprising:
following application of regenerative braking torque, inhibiting reduction of the regeneration braking torque if the friction braking torque pressure is sufficiently large to modulate an antilock braking system without the reduction of the regenerative braking torque, the inhibiting followed by friction braking.

17. The method of claim 16 further comprising applying regeneration braking torque if the antilock braking system is not active.

18. The method of claim 17 further comprising applying friction braking if the antilock braking system is not active.

19. The method of claim 16 further comprising not inhibiting reduction of the regeneration braking torque if the friction braking torque pressure is not sufficiently large to modulate the antilock braking system without the reduction of the regenerative braking torque.

20. The method of claim 16 further comprising determining whether a collision mitigation by brakes event is occurring and inhibiting reduction of regeneration braking torque if the collision mitigation by brakes event is occurring.

* * * * *